Aug. 26, 1958 N. CAPELLARO 2,849,179
COLUMN AND FUNCTION CONTROLS FOR AN ACCOUNTING
MACHINE HAVING A TRAVELING PAPER CARRIAGE
Filed June 1, 1955 2 Sheets-Sheet 1

Inventor
Natale Capellaro
by W. R. Hulbert Atty.

Aug. 26, 1958 N. CAPELLARO 2,849,179
COLUMN AND FUNCTION CONTROLS FOR AN ACCOUNTING
MACHINE HAVING A TRAVELING PAPER CARRIAGE
Filed June 1, 1955 2 Sheets-Sheet 2
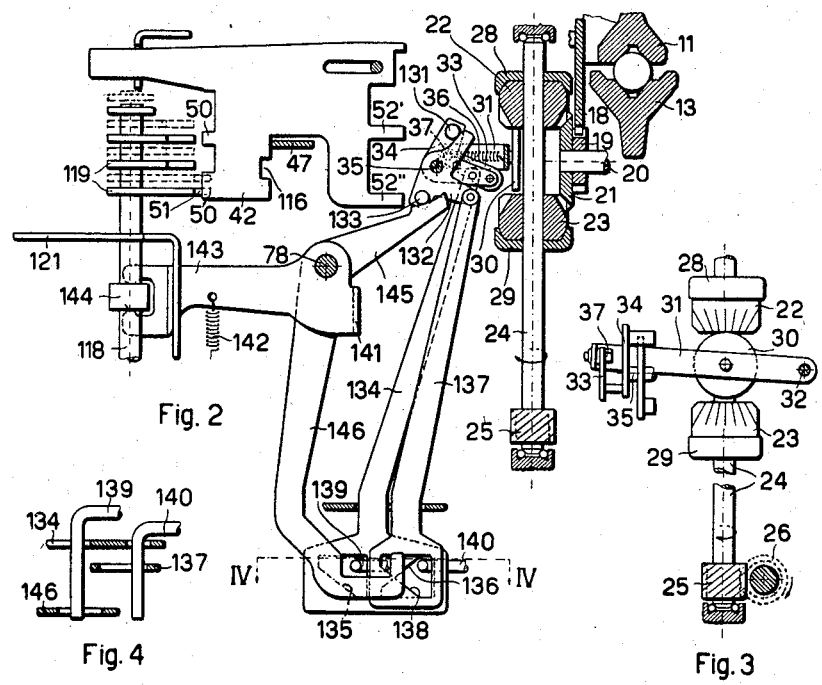
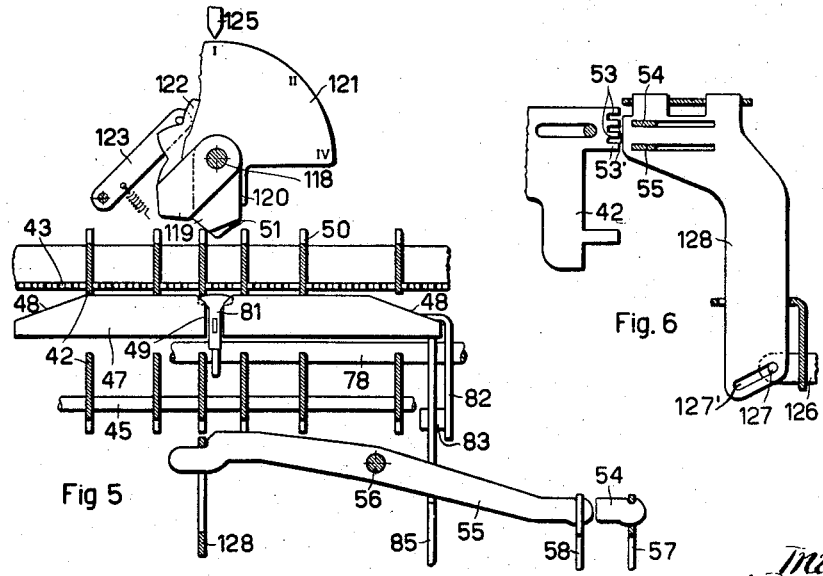
Inventor
Natale Capellaro 2,849,179
Patented Aug. 26, 1958

United States Patent Office

2,849,179

COLUMN AND FUNCTION CONTROLS FOR AN ACCOUNTING MACHINE HAVING A TRAVELING PAPER CARRIAGE

Natale Capellaro, Ivrea, Italy, assignor to Ing. C. Olivetti & C., S. p. A., Ivrea, Italy, a corporation of Italy Application June 1, 1955, Serial No. 512,532

Claims priority, application Italy June 11, 1954

11 Claims. (Cl. 235—60.47)

The present invention relates to accounting machines and the like having a traveling paper carriage.

Paper carriages are often provided with a set of column stops which are adapted to locate the carriage in predetermined columnar positions and to control various functions of the machine according to a predetermined program of automatically performed machine functions.

Usually a distinct set of column stops is provided for each one of said function control programs, said set being arranged on a transverse bar which is removably mounted on the carriage to enable the programs to be changed.

Sometimes a plurality of said bars, each one corresponding to a particular program, is carried by a common support, which is movable mounted on the carriage and adjustable to different positions to select any one of said bars to render the corresponding program effective.

Both the removably mounted single bar and the adjustably mounted common support render the structure of the carriage intricated and of difficult manufacture. Moreover, the column stops are subject to rapid wear due to the repeated shocks of said stops against the usual counterstop which is mounted on a stationary support of the machine for arresting the travel of the carriage.

A traveling paper carriage is known wherein the machine function controlling function of the stops is separated from the carriage arresting function thereof. In this case a plurality of separate sets of control elements according to a plurality of programs is arranged on a common support, an auxiliary column stop bar being provided for locating the carriage in predetermined columnar positions. Said support and said column stop bar are both movably mounted on the carriage and adjustable to different positions to select said columnar positions according to a selected program. This structure makes the carriage very heavy and does not avoid the disadvantage of the movability of the support and bar and of the shocks on the column stops.

Moreover, the accounting machines with automatically controlled functions hitherto known have not the desired versatility and flexibility with regard to the extent of variation of programs and have not provided the desired extent of automatic control.

The invention has been devised to obviate these disadvantages and to provide an improved accounting machine with automatically controlled functions.

A more particular object is to provide an accounting machine providing automatic function control to the fullest extent, providing the greatest versatility and flexibility in function control programming, and permitting the operator to render any selected one of a plurality of function control programs effective very quickly and in a very easy and simple manner.

Another object of the invention is to provide an improved accounting machine wherein the column stops carried by the carriage are relieved from any excessive mechanical effort.

In accordance with the invention, I provide in an accounting machine having a traveling paper carriage, a set of column stops mounted on said carriage and movable bodily therewith to locate the carriage in predetermined columnar positions, said column stops being normally in an ineffective position. I further provide means operable for arresting said carriage in any of said columnar positions, means mounted on a stationary support for cooperation with said column stops during travel of the carriage to individually shift said column stops from said ineffective position to an effective position, and means controlled by said column stop upon being so shifted to operate said arresting means for arresting said carriage.

Further objects, features and advantages of the invention will become apparent from the following detailed description of a preferred embodiment thereof taken in conjunction with the accompanying drawings in which like numerals refer to like parts in the several views and in which:

Fig. 2 is a partial left-hand longitudinal view through the traveling paper carriage of said machine;

Fig. 3 is a rear view of a detail of Fig. 2;

Fig. 4 is a sectional view taken on line IV—IV of Fig. 2;

Fig. 5 is a sectional view taken on line V—V of Fig. 1;

Fig. 6 is a further partial left-hand longitudinal view through said carriage.

Figure 1:
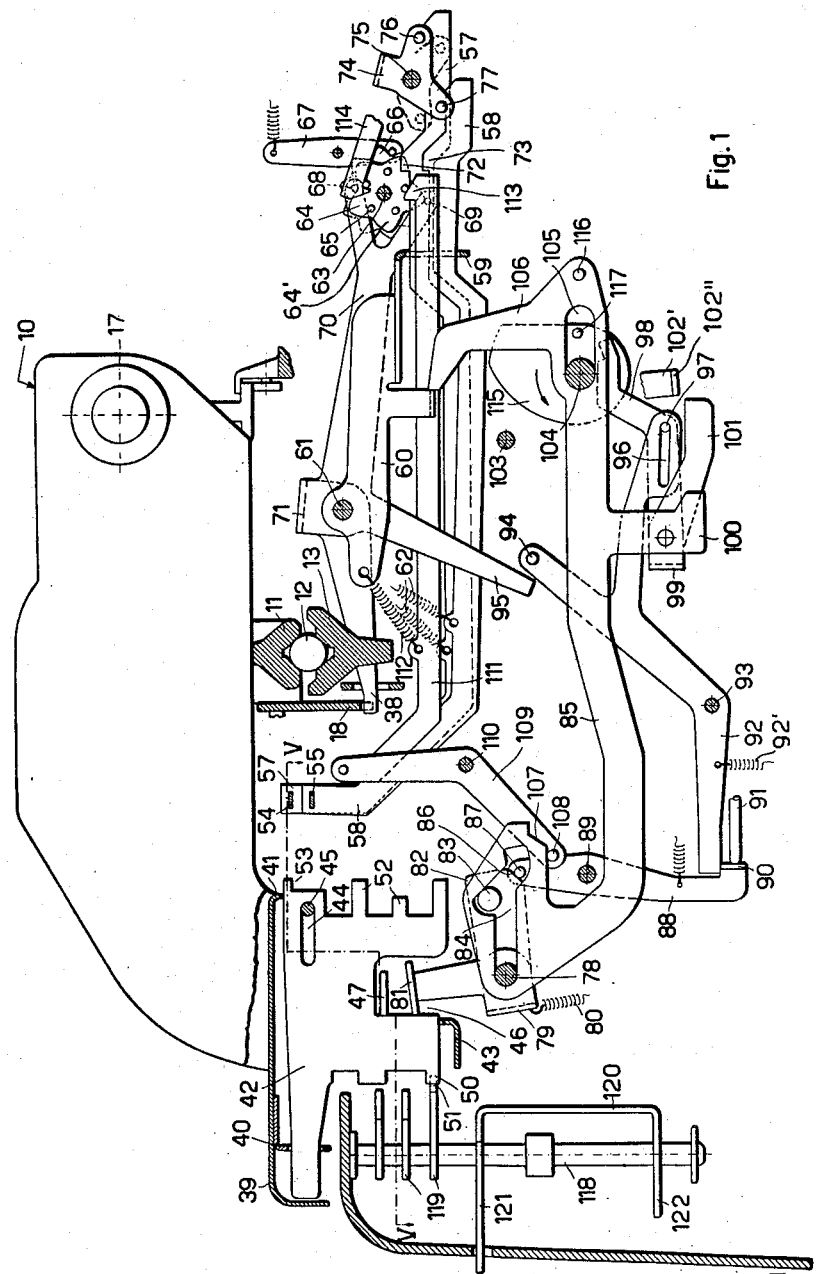
Fig. 1 is a partial left-hand longitudinal view through an accounting machine embodying the invention.

The general structure of the accounting machine shown in the drawings is derived, by way of example, from the machine illustrated in connection with applicant's copending applications Serial Number 369,059 of July 20, 1953, and Serial Number 413,620 of March 2, 1954, to which reference may be had for a more detailed description thereof.

With reference to Fig. 1, the carriage 10 is provided with a rail 11 running by means of a plurality of balls 12 on a stationary runway 13.

The carriage 10 is further provided with a platen 17 for the record medium, and with a rack 18 secured to the carriage and engaging a pinion 19 (Fig. 2) journalled on a stationary shaft 20. The pinion 19 is integral with a bevel gear 21, which is constantly in mesh with two opposed bevel gears 22 and 23 loosely mounted upon a vertical shaft 24. The shaft 24 is adapted to be driven through a worm wheel 25 and a worm 26 (Fig. 3) by a driving motor, not shown in the drawings.

The bevel gears 22 and 23 are adapted to be alternately friction driven by two cup like shaped drivers 28 and 29, respectively, fitting closely to the rear face of said gears, and secured to the shaft 24. A rubber roller 30 is adapted to alternately press either bevel gear 22 and 23 against the corresponding driver to establish a friction driving connection therebetween and thus to establish the direction of motion of the carriage. To this end the roller 30 is mounted on a lever 31 (Figs. 2 and 3), which at its one end is pivoted on a stationary pivot 32 and at its other end is linked to a lever 33. The lever 33 is pivoted in turn on a lever 34, pivotally mounted on a stationary pivot 35. A spring 36 tensioned between a stud 37 secured to the lever 33 and the lever 31, constantly urges the stud 37 to the right, as viewed in Fig. 2.

By rocking the lever 34 counterclockwise (Fig. 2), the lever 33, whose roller 30 now contacts the upper bevel gear 22, is rocked counterclockwise about its pivot connection with the lever 31. As said pivot connection passes the dead center line of the spring 36, it snaps downwards, thus rocking the lever 31 counterclockwise (as viewed in Fig. 3) and shifting the roller 30 into contact with the lower bevel gear 23. It will thus be apparent that under the control of the reversing lever 34 the roller 30 is adapted to alternately engage the two bevel gears 22 and 23, thus constantly maintaining the motion of the carriage in either direction. The carriage, however, is adapted to be locked against movement by a pawl 38 (Fig. 1) engaging the rack 18, thus causing the bevel gear 22 or 23 which is engaged by the roller 30 to slip on the corresponding friction driver 28 or 29, respectively.

In the position shown in Figs. 2 and 3, wherein the roller 30 engages the upper bevel gear 22, the carriage is urged to advance from right to left, as viewed from the front of the machine.

A transverse bar 39 (Fig. 1) secured to the carriage 10 is provided with three comb bars 40, 41 and 43, in the slots of which is arranged a set of column stops 42 (Figs. 1 and 5). Each column stop 42 is provided with a slot 44 by means of which it is longitudinally movable on a rod 45. Each column stop is formed with an aperture 46 to make place for a stationary transverse bar 47. The bar 47 is formed with two sloping ends 48 (Fig. 5), which during the travel of the carriage are adapted to cooperate with the column stops 42 to move them rearwards. The bar 47 is formed with a central interruption 49 to permit the longitudinal movement of the column stop which is placed behind it.

Each column stop 42 is formed with one or more shifting projections 50 (Fig. 1) cooperating with a wedge shaped shifting member 51 (Fig. 5) mounted on a stationary support of the machine. Moreover, each column stop 42 is formed with a number of function control projections 52 adapted to automatically control a corresponding number of machine functions by known means, which will not be described here. Finally, each column stop 42 is formed with a number of stop projections 53 cooperating with one end of two levers 54 and 55 pivotally mounted on a stationary shaft 56 (Fig. 5). The opposed end of said levers is linked to two slides 57 and 58, respectively, sliding in two slots of a comb shaped projection 59 of a lever 60 pivoted on a stationary shaft 61. A spring 62 tensioned between each one of the slides 57 and 58 and the lever 60 urges the latter counterclockwise and the slides 57 and 58 forwards (to the right as viewed in Fig. 1).

A plate 64 formed with five like spaced projections 64' and carrying five studs 65, is pivotally mounted on a shaft 63. A second plate 66 is secured to the plate 64 and is formed with ten projections 66' cooperating with a spring actuated positioning member 67. The projections 64' cooperate with two diametrically opposed studs 68 and 69 secured to the two branches of a bifurcated arm 70 projecting from a bail 71 pivoted on the shaft 61. By viewing Fig. 1 it will be apparent that due to the odd number of the projections 64', if the stud 68 is placed in a notch between two adjacent projections 64', the opposed stud 69 contacts the top of a projection 64'. If now the plates 64 and 66 are rotated in either direction through one projection 66', the above stated relationship between the studs 68, 69 and the plate 64 will be reversed and the bail 71 will be rocked counterclockwise about its shaft 61. Since the bail 71 carries the locking pawl 38, it will be seen that the pawl 38 will unlock the rack 18.

The plates 64 and 66 may be stepwise rotated about the shaft 63 by two pawl like projections 72 and 73 formed on the slides 57 and 58, respectively, said projections being adapted to alternately engage the studs 65. The forward ends of the slides 57 and 58 cooperate with two studs 76 and 77, respectively, of a bail 74 pivoted on a shaft 75. The bail 74 may assume, by known means which will not be described here, two positions according to the character of the amount stored in the register of the machine. If said amount is positive, the bail 74 assumes the position shown in Fig. 1 in full lines, wherein its stud 77 prevents the slide 58 from engaging the studs 65 with its projection 73. If said amount becomes negative, the bail 74 is rocked into the positions shown in broken lines, wherein its stud 76 prevents the slide 57 from engaging the studs 65 with its projection 72.

A bail 79, pivoted on a stationary shaft 78 and urged counterclockwise by a spring 80, is provided on one of its arms with a shifting lug 81, which is placed below the interruption 49 of the bar 47 (Fig. 5). Another arm 82 of the bail 79 is provided with a stud 83 cooperating with a cam slot 84 of a slide 85. The arm 82 is formed with an inclined edge 86 cooperating with a stud 87 secured to a lever 88 pivoted on a stationary shaft 89. The lever 88 is formed with a bent-over lug 90 which may be acted upon by a pin 91 which, by known means which will not be described here, is shifted rearwards (to the left as viewed in Fig. 1) upon depression of any motor key of the machine. The bent-over lug 90 is furthermore engaged by a rearward arm of a lever 92 urged by spring 92'. The lever 92 is pivoted at 93 and is provided on an upward arm with a stud 94 cooperating with an arm 95 of the bail 71. A forward arm of the lever 92 is formed with a slot 96 engaging a stud 97 secured to an arm 98 of a bail 99. The bail 99 is pivoted on a downward extension 100 of the slide 85 and is formed with a forward arm 101 which upon being lifted is adapted to be engaged by a bent-over lug 102 of an arm 102' pivoted on a shaft 103. As is fully described in applicant's copending application S. N. 413,620, the arm 102', which may be considered as an arm of the bail 43 shown in Fig. 1 of said application, is adapted to be oscillated back and forth about its pivot shaft as long as the motor shaft is rotating. This oscillating movement is provided to render an auxiliary clutch effective, whose action precedes the action of the usual main clutch of the main operating shaft shown here with the numeral 104, the main clutch being rendered effective substantially upon completion of the action of the auxiliary clutch.

The slide 85 is slidably mounted by means of the slot 84 and of a slot 105 on the shafts 78 and 104, respectively. An upward arm 106 of the slide 85 cooperates with a bent-over lug 60' of the lever 60. An inclined edge 107 of the slide 85 cooperates with a stud 108 secured to a lever 109 pivoted at 110 and linked to a slide 111. A spring 112 is tensioned between the lever 60 and the slide 111. The slide 111 is formed at its forward end with a pawl like projection 113 cooperating with the studs 65. The numeral 114 indicates a pawl which also cooperates with the studs 65 and which, by known means which will not be described here, is shifted forwards (to the right as viewed in Fig. 1) upon each depression of a carriage tabulating or a carriage return key.

A cam disc 115 secured to the main shaft 104 cooperates with a stud 116 secured to the slide 85 to shift the latter forwards. A stud 117 secured to the cam disc 115 cooperates with the arm 98 to rock the bail 99 clockwise.

Assume now that the motor is at rest and that the reversing lever 34 (Fig. 2) is in the position shown in Fig. 2, wherein the carriage is conditioned for being advanced from right to left.

Upon depression of a carriage tabulating key, the motor circuit is closed and the pawl 114 is shifted forwards to rotate the plates 64 and 66 one step. The bail 71 will thus be rocked counterclockwise and the pawl 38 will unlock the rack 18. The carriage is thereby enabled to follow the drive of the conditioned friction clutch and to be advanced from right to left. At the same time, the arm 102' is rocked back and forth about the pivot shaft 103 as explained above. Since the arm 101 is out of the path of the bent-over lug 102, the arm 102' moves idly.

If during the tabulating movement of the carriage a shifting projection 50 of a column stop 42 (Fig. 1) engages the shifting member 51, the column stop 42 is shifted forwards. The stop projection 53 of the column stop 42 rocks thus the lever 54 counterclockwise (as viewed in Fig. 5), whereby the slide 57 is shifted rearwards. The projection 72 of the latter engages one of the studs 65 and rotates the plates 64 and 66 one step. The bail 71 is thus restored to its position of Fig. 1 and the pawl 38 locks the rack 18 in the columnar position corresponding to the particular column stop considered. It will be apparent that both the shifting member 51 and the column stop 42 are relieved from the impact of the carriage, which is entirely supported by the pawl 38. To this end the pawl 38 may be provided with suitable shock-absorbing means, as rubber pads, for instance.

If no stop projection 53 is arranged in front of the lever 54, the column stop will not be capable of engaging the lever 54 and of arresting the carriage. Likewise, if the register shows a negative balance, the stud 76 depresses the slide 57 thus disabling the projection 72 thereof, whereby a column stop having its stop projection facing the lever 54 will not stop the carriage.

If the column stop 42 is formed with a notch 116 (Fig. 2) preventing the column stop from engaging the lug 81 (Fig. 1), the column stop is not shifted further and the depressed tabulating key is restored by known means, thus opening the motor circuit. In this case it will be apparent that the only scope of the particular column stop considered is that of locating the carriage in a predetermined columnar position.

If, on the contrary, the column stop is of the type shown in Fig. 1, upon being shifted forwards by the shifting member 51 it engages the lug 81, thus rocking the bail 79 clockwise. The inclined edge 86 thereof engages the stud 87 and rocks the lever 88 clockwise, thus releasing the lever 92. The latter will be rotated counterclockwise by its spring 92', provided the bail 71 is in the carriage locking position shown in Fig. 1. In the alternative, the lower arm 95 of the bail 71 would engage the stud 94 and prevent the lever 92 from being rocked counterclockwise.

Assuming that the bail 71 is in the position shown in Fig. 1, the slot 96 of the lever 92 rocks the bail 99 counterclockwise, thus moving the arm 101 into the path of the bent-over lug 102. As explained above, the arm 102' is rocked back and forth, whereby it is now enabled to engage the arm 101 and to shift it rearwards together with the slide 85. The arm 106 of the slide 85 rocks the lever 60 clockwise, thus lowering the projection 59, whereby the slides 57 and 58 carried thereby are prevented from further engaging the studs 65. Moreover, the cam slot 84 of the slide 85 engages the stud 83 and rocks the bail 79 clockwise, whereby its lug 81 pushes the column stop further forwards. During this latter movement the function control projections 52 of the column stop engage a number of control means, not shown in the drawings, to automatically condition the machine to perform the corresponding functions. Finally, the slide 85 enables the lever 109 to be rocked clockwise by the slide 111 which is shifted forwards by its spring 112.

Upon completion of its travel, the slide 85 renders the main clutch effective to clutch the main operating shaft 104. As mentioned above, the means for clutching the main operating shaft are disclosed in applicant's copending application S. N. 413,620, it being assumed that the slide 85 works substantially in the same manner as the slide 37 described in said application.

Towards the end of the machine cycle thus started, the stud 117 secured to the cam disc 115 engages the arm 98 and rocks the bail 99 clockwise, thus restoring the arm 101 out of the path of the bent-over lug 102. The cam disc 115 engages the stud 116 and restores the slide 85. The bail 79 rocks counterclockwise and shifts the column stop 42 rearwards. The lever 88 reengages the lever 92 and the arm 106 of the slide 85 enables the lever 60 to restore the projection 59 and the slides 57 and 58 carried thereby. Finally, the inclined edge 107 engages the stud 108 and rocks the lever 109 counterclockwise, thus shifting the slide 111 rearwards. The projection 113 thereof engages one of the studs 65 and rotates the plates 64 and 66 one step, thus unlocking the carriage 10 and starting a new tabulation.

Assuming now that the carriage has been located by a column stop 42 formed with a notch 116 as described above, if a motor key is thereupon depressed the pin 91 pushes the lever 88 rearwards and releases the lever 92, thereby starting the same sequence of operations as disclosed in connection with a column stop 42 not formed with a notch 116.

It will be apparent from the foregoing description that the single bar 39 (Fig. 1) may carry a plurality of sets of column stops according to a plurality of function control programs, the column stops corresponding to a desired program being accordingly selected during the travel of the carriage. To this end the shifting projections 50 may be arranged in different positions, each one corresponding to a selected program.

More particularly, the shifting member 51 is formed on an arm 119 which is secured to a vertical shaft 118 journalled on a stationary support of the machine. Three further arms 119, each one formed with a similar shifting member 51, are secured to the shaft 118 above the first considered arm 119, said arms being arranged at 45° from each other (Fig. 5).

A bail 120 secured to the shaft 118 is formed with an upper arm 121 carrying identation marks arranged at 45° from each other according to the arms 119 and movable before a stationary index member 125. A lower arm 122 of the bail 120 is formed with like spaced notches cooperating with a positioning member 123.

To change the function control program the arm 121 is rotated according to the desired program, whereby a selected one of the four shifting members 51 is moved into the path of the shifting projections 50 arranged in the corresponding position.

A further selection of the function control programs may be made by changing the position of the levers 54 and 55. To this end the levers 54 and 55 are supported by a vertically movable slide 128 (Fig. 6). The slide 128 is formed with a slot 127' engaged by a stud 127 secured to a lever 126. By shifting the lever 126 rearwards (to the left as viewed in Fig. 6) by means of a suitable key, not shown in the drawings, the slide 128 is moved upwards, thus restoring the levers 54 and 55 from the lower position shown in Fig. 6 to the upper position shown in Fig. 1. To allow this movement of the levers 54 and 55, the pivot connection thereof with the pivot shaft 56 (Fig. 5) is made with suitable clearance. In the lower position shown in Fig. 6, the levers 54 and 55 cooperate with two stop control projections 53', instead of the normal stop control projections 53.

The direction of travel of the carriage may either be automatically predetermined by means of the column stops 42 or be selected by means of the usual keys of the machine. To this end the reversing lever 34 (Fig. 2) carries a stud 131 adapted to cooperate with a carriage direction control projection 52' formed on the column stop 42 as well as with a lever 132. The latter is pivoted on the shaft 35 and is provided with a stud 133 cooperating with a further carriage direction control projection 52" formed on the column stop 42. A lever 134 linked to the lever 34 is formed with two cam faces 135 and 136. A lever 137 pivoted on the lever 132 is provided with a similar cam face 138. The cam face 135 cooperates with the bent-over end of a rod 139 (Fig. 4) controlled by the tabulating key mentioned above. The cam faces 136 and 138 cooperate with the bent-over end of a rod 140 controlled by a carriage return key, not shown in the drawings.

A bail 141 pivoted on the shaft 78 is formed with a first arm 143 engaging a hub 144 secured to the shaft 118, with a second arm 145 cooperating with the stud 133 and with a third arm 146 cooperating with the rods 139 and 140.

Assume now that the machine is at rest and that the carriage return key is depressed. The rod 140 is shifted rearwards by known means, the motor circuit is closed and the pawl 114 (Fig. 1) is shifted forwards. The rod 140 engages the cam face 136 and moves the lever 134 upwards, thus rocking the reversing lever 34 counterclockwise, whereby the roller 30 is shifted from the upper bevel gear 22 to the lower bevel gear 23. Furthermore, the pawl 114 is shifted forwards as usually, thus rotating the plates 64 and 66 one step and unlocking the carriage 10.

During its rearward movement, the rod 140 engages the arm 146 and rocks the bail 141 clockwise. The arm 143 lifts the shaft 118, thus moving the arms 119 into the upper position shown in Fig. 2 with broken lines. Thus during the carriage return the shifting projections 50 don't interfere with the shifting members 51. To arrest the return of the carriage the column stops may be formed with a shifting projection 50' (Fig. 2) which is twice as high as a normal projection 50 (Fig. 1), to be capable of being engaged by the shifting member 51 in the raised position of the latter. Upon such an engagement during the carriage return the column stop is shifted forwards as usually and the sequence of operations described above is started. If now the carriage return key is depressed again, the reversing lever 34 is already in carriage return position and the carriage resumes its return movement.

If, on the contrary, a tabulating key is depressed, besides the operations described above the key shifts the rod 139 rearwards. The rod 139 engages the cam face 135 and restores the reversing lever 34 to the position shown in Fig. 2. Moreover, the rod 139 engages the arm 146 and turns the bail 141 clockwise, thus lifting the shaft 118.

If now the depressed tabulating key is immediately abandoned, the key is restored to normal thus restoring the rod 139. The bail 141 is rocked counterclockwise by its spring 142 and the carriage will be arrested by a column stop of the type shown in Fig. 1, as disclosed above. If, on the contrary, the tabulating key is held depressed, the shaft 118 remains lifted and the carriage is arrested by a column stop having a shifting projection 50' (Fig. 2) as described above.

If the tabulating key is depressed again, the reversing lever 34 is already in the position shown in Fig. 2 and the carriage resumes its tabulating movement.

Carriage return may be automatically controlled by the column stop itself by means of the projection 52" (Fig. 2). As the column stop is shifted forwards during a tabulation as described above, the projection 52" engages the stud 133 and rocks the lever 132 counterclockwise. The reversing lever 34 is thus rocked counterclockwise and at the same time the stud 133 rocks the bail 141 clockwise, whereby the shaft 118 is lifted. The ensuing carriage movement will thus be a return movement.

If during this movement the carriage is arrested by a column stop having a projection 52' (Fig. 2), said projection, upon being shifted forwards, engages the stud 131 and restores the reversing lever to the position shown in Fig. 2.

From the foregoing description it will be evident to those skilled in the art that many changes may be made in the above construction, and different embodiments of the invention could be made without departing from the scope thereof. It is therefore intended that all matter contained in the above description, or shown in the accompanying drawings, shall be interpreted as illustrative, and not in a limiting sense.

What I claim is:

1. In an accounting machine having a traveling paper carriage, means for moving said carriage, a set of column stops mounted on said carriage and movable bodily therewith to locate the carriage in predetermined columnar positions, said column stops being normally in an ineffective position, a rack on said carriage extending along the path of travel of the carriage and having a pitch equal to the distance between two adjacent of said columnar positions, a detent cooperating with said rack for arresting said carriage in any of said columnar positions, said detent being alternately movable between an effective position and an ineffective position, a stepwise movable device cooperating with said detent to alter at each step the position thereof, key controlled means for moving said device one step, a pair of moving members associated with said device and adapted to alternately move said device one step, said moving members being engageable by a selectable portion of said column stops to so move said device, means for altering the relationship between said pair of moving means and said device, manual means operable to select said portion, means mounted on a stationary support for cooperation with said column stops during travel of the carriage to individually shift said column stops from said ineffective position to an effective position, and means controlled by said column stops upon being so shifted to engage said moving member for arresting said carriage.

2. In an accounting machine having a movable paper carriage, a set of column stops mounted on said carriage and movable bodily therewith to locate the carriage in predetermined columnar positions, said column stops being normally in an ineffective position, means for moving said carriage in either direction, said moving means comprising a power shaft, a carriage driving shaft, and a pair of friction clutches between said power shaft and said driving shaft for alternately rotating said driving shaft in either direction, means for alternately rendering either one of said clutches effective and the other clutch ineffective, means operable for arresting said carriage in any of said columnar positions against the drive of the effective clutch, means mounted on a stationary support for cooperation with said column stops during movement of the carriage to individually shift said column stops from said ineffective position to an effective position, and means controlled by said column stops upon being so shifted to operate said arresting means for arresting said carriage.

3. In an accounting machine having a movable paper carriage, a set of column stops mounted on said carriage and movable bodily therewith to locate the carriage in predetermined columnar positions, said column stops being normally in an ineffective positions, means for moving said carriage in either direction, means movable between a first and a second position for reversing said direction, means operable for arresting said carriage in any of said columnar positions, a member mounted on a stationary support for cooperation with a predetermined portion of said column stops during movement of the carriage to individually shift said column stops from said ineffective position to an effective position, said member being movably mounted on said support to alter its position with respect of said column stops to engage a different portion thereof, means controlled by said column stops upon being so shifted to operate said arresting means for arresting said carriage, means controlled by a column stop having said predetermined portion upon being so shifted for moving said reversing means from the first position to the second position, means controlled by said reversing means upon being so moved for altering the position of said member, and means controlled by a column stop having said different portion upon being so shifted for moving said reversing means from said second position to the first position.

4. In an accounting machine having a traveling paper carriage, a set of column stops mounted on said carriage and movable bodily therewith to locate the carriage in predetermined columnar positions, said column stops being normally in a first position, means operable for arresting said carriage in any of said columnar positions, means mounted on a stationary support for cooperation with a selected portion of said column stops during travel of the carriage to individually shift said column stops from said first position to a second position, means controlled by said column stops upon being shifted from said first to said second position to operate said arresting means for arresting said carriage, power means, an actuator engageable by said power means for individually shifting said column stops from said second to a third position to enable said column stops to automatically control predetermined machine functions, and means controlled by said column stops upon being shifted from said first to said second position to enable said power means to engage said actuator.

5. In an accounting machine having a traveling paper carriage, means for moving said carriage, a set of column stops mounted on said carriage and movable bodily therewith, said column stops being normally in a first position, means operable for arresting said carriage in a preselected columnar position, means mounted on a stationary support for cooperation with said column stops during travel of the carriage to individually shift said column stops from said first position to a second position, means controlled by said column stops upon being so shifted to operate said arresting means, and an actuator also controlled by the column stop so shifted to further shift said shifted column stop from said second to a third position to automatically control predetermined machine functions.

6. In an accounting machine having a traveling paper carriage, means for moving said carriage, a set of column stops mounted on said carriage and movable bodily therewith, said column stops being normally in an ineffective position, means operable for arresting said carriage in a preselected columnar position, a first element on each one of said column stops, said first elements being shiftable to operate said arresting means, means mounted on a stationary support for cooperation with said stops during travel of the carriage to individually shift said first elements, a second shiftable element on each one of said column stops, means operable by said second elements when shifted to automatically control predetermined machine functions, and an actuator controlled by the first element upon being shifted to shift the corresponding second element.

7. In an accounting machine having a traveling paper carriage, means for moving said carriage, a set of column stops mounted on said carriage and movable bodily therewith, said column stops being normally in a first position, means mounted on a stationary support for cooperation with said column stops during travel of the carriage to individually shift said column stops from said first position to a second position, a transverse rack fixed to said carriage, a member adapted to lock said rack for arresting said carriage in a preselected columnar position, said locking member being movable between a locking position and an unlocking position, a moving device for moving said locking member to said locking position, a pair of intermediate elements alternatively engaging said moving device, said elements being selectively operable by said column stops upon said movement from said first to said second position, the element engaging said moving device when so operated causing said moving device to move said locking member, and means for altering the relationship between said two intermediate elements and said moving device.

8. In an accounting machine having a traveling paper carriage, means for moving said carriage, a set of column stops mounted on said carriage and movable bodily therewith, said column stops being normally in a first position, means operable for arresting said carriage in a preselected columnar position, means mounted on a stationary support for cooperation with said column stops during travel of the carriage to individually shift said column stops from said first position to a second position, means controlled by said column stops upon being shifted from said first to said second position to operate said arresting means, an actuator movable through a first extent by said column stops upon being so shifted, power means operable for moving said actuator through a second extent to individually shift said column stops from said second to a third position, said column stops upon being moved to said third position being adapted to automatically control predetermined machine functions, and means controlled by said actuator upon moving through said first extent for conditioning said power means for operation.

9. In an accounting machine having power means, a main operating mechanism for effecting machine functions and a main clutch engageable by said power means to drive said main operating mechanism, and an auxiliary clutch engageable by said power means to move an auxiliary operating mechanism from an ineffective position to an effective position, said auxiliary operating mechanism when so moved being adapted to cause said power means to engage said main clutch, the combination of a traveling paper carriage, means for moving said carriage, a set of column stops mounted on said carriage and movable bodily therewith, said column stops being normally in a first position, means operable for arresting said carriage in any of said columnar positions, means mounted on a stationary support for cooperation with said column stops during travel of the carriage to individually shift said column stops from said first position to a second position, first means controlled by said column stops upon being so shifted to operate said arresting means, second means controlled by said column stops upon being so shifted to cause said auxiliary clutch to be engaged by said power means, and an actuator drivable by said auxiliary operating means when moved to said effective position for individually shifting said column stop from said second to a third position to enable said column stops to automatically control said machine functions.

10. In an accounting machine as claimed in claim 9, wherein said main opeating mechanism is adapted to return said auxiliary operating mechanism from said effective position to said ineffective position, the combination of a transverse rack fixed to said carriage, said arresting means including a member adapted to lock said rack, said member being alternatively movable between a locking position and an unlocking position, said first controlled means being adapted to move said member to said locking position, and means operable by said auxiliary operating mechanism when returned to said ineffective position to move said member to said unlocking position for releasing said carriage.

11. In an accounting machine as claimed in claim 10, means controlled by said locking member when in said unlocking position for preventing said auxiliary clutch from being engaged by said power means.

References Cited in the file of this patent

UNITED STATES PATENTS

| | | |
|---|---|---|
| 1,135,500 | Chapin | Apr. 13, 1915 |
| 1,260,728 | Stickney | Mar. 26, 1918 |
| 1,988,896 | Greve | Jan. 22, 1935 |
| 2,056,747 | Sundstrand | Oct. 6, 1936 |
| 2,058,922 | Stickney | Oct. 27, 1936 |
| 2,214,897 | Bower | Sept. 17, 1940 |
| 2,229,764 | Muller | Jan. 28, 1941 |
| 2,229,765 | Bower | Jan. 28, 1941 |
| 2,254,765 | Anderson | Sept. 2, 1941 |
| 2,626,749 | Christian | Jan. 27, 1953 |